2,905,654

N-PHENYL-p-PHENYLENEDIAMINE AS ANTI-OZONANT FOR BUTADIENE - STYRENE RUBBERY COPOLYMER

Joseph C. Ambelang, Akron, Ohio, assignor to The Firestone Tire & Rubber Company, Akron, Ohio, a corporation of Ohio No Drawing. Application December 16, 1955
Serial No. 553,442

2 Claims. (Cl. 260—45.9)

This invention relates to the use of monoaryl-substituted paraphenylenediamines (p-aminodiphenylamines) as antiozonants in the rubber copolymer of butadiene and styrene, known as GR-S. The invention includes the stabilized rubber and its vulcanization.

The phenyl groups of the p-aminodiphenylamines may be unsubstituted, or either or both of the phenyl groups may be substituted. Likewise, either or both of the amino groups may be substituted. The antiozonants may contain one or more substituents, and there may be substituents in both one or both of the phenyl groups and one or both of the amino groups. The possible substituents are alkyl or other aliphatic hydrocarbon groups of 1 to 8 carbon atoms, and one or both aryl groups may be chlorine substituted.

Thus the antiozonants of this invention may be represented by the following formula

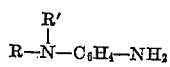

where the amino groups are para to each other, where R is from the class consisting of unsubstituted aryl groups, chlorine-substituted aryl groups, and aryl groups substituted with aliphatic hydrocarbon groups containing 1 to 8 carbon atoms, including aryl groups in which there is more than one substituent, and where R' is from the class consisting of hydrogen and aliphatic hydrocarbon groups containing 1 to 8 carbon atoms. Thus, the antiozonants include in addition to N-phenyl-p-phenylenediamine, substituted N-phenyl-p-phenylenediamines including, for example, the following:

N-(4-tt-octylphenyl)-p-phenylenediamine
N-(4-ethylphenyl)-p-phenylenediamine
N-(3,4-dimethylphenyl)-p-phenylenediamine
N-(4-ethylphenyl)-p-phenylenediamine
N-(2,3,5-trimethylphenyl)-p-phenylenediamine
N-(4-butylphenyl)-p-phenylenediamine
N-(4-ethylphenyl)-p-phenylenediamine
N-(4-amylphenyl)-p-phenylenediamine
N-(4-octylphenyl)-p-phenylenediamine
N-(4-chlorophenyl)-p-phenylenediamine
N-(4-cyclohexylphenyl)-p-phenylenediamine
N-(beta-naphthyl)-p-phenylenediamine
N-phenyl-N-methyl-p-phenylenediamine
3-methyl-4-aminodiphenylamine Oxygen and ozone both have a harmful effect on rubber, but the effect of each is different, and compounds which inhibit or prevent the harmful effect of one are not necessarily effective in stopping or retarding the harmful effect of the other.

Crabtree and Kemp in an article in Industrial and Engineering Chemistry, vol. 38, starting at page 278 (1946), explain the difference in the action of oxygen and ozone on rubber. The light-catalyzed oxidation which occurs during outdoor exposure forms a skin and crazed appearance over the exposed surface of the rubber. Ozone, on the other hand, even in very low concentration, induces cracking in rubber, but only if the rubber is stretched (C. H. Leigh-Dugmore, Rubber Age and Synthetics (London), November 1952, pages 398, 399 and December 1952, pages 442, 444, 445.) The cracks are perpendicular to the direction of stretch. Such cracking can occur in the absence of light. Compounds which inhibit ozone deterioration are referred to herein as antiozonants.

Tires are stressed when inflated. While a tire is at rest it is stretched statically, and on a moving vehicle it is stretched dynamically, i.e., it undergoes alternating stretching and relaxing. Some of the antiozonants are more effective in static tests and others are more effective in dynamic tests. Antiozonants which are effective under both conditions will be desired for tires, but for other rubber products an antiozonant which does not meet both tests may be used.

The inhibiting effect of the antiozonants of this invention on rubber was determined by treatment of unaged, cured stocks with air of controlled ozone content in specially designed equipment. The tests were conducted with one-half inch dumbbell samples of approximately 100 gauge thickness. The special apparatus for testing with air of controlled ozone content, and the method of testing therein are described in the articles by Ford and Cooper, entitled "A Study of the Factors Affecting the Weathering of Rubber-like Materials, I and II," appearing in India Rubber World, vol. 124, pages 696–698, 701 (September 1951), and vol. 125, pages 55–60 (October 1951). The following reports refer to tests in some of which the ozone concentration was maintained at 25 parts per 100,000,000 and in one of which the ozone concentration was maintained at 60 parts per 100,000,000. Two types of tests were conducted. In one type, called the dynamic test, the sample was repeatedly stretched between the limits of 0 and 20 percent elongation at the rate of 108 cycles per minute. In the other type of test, the static test, the samples were stretched at 12.5 percent elongation throughout the test. On completion of each test the number and size of the cracks in each sample were compared visually with the number and size of the cracks in a blank strip from the same masterbatch which contained no antiozonant and which was cured and tested at the same time as the test sample. The number of cracks was reported on an arbitrary scale as follows: "none," "very few" (or "v. few"), "few," "moderate," "moderate-to-numerous" (or "mod.-num."), and "numerous." The size of the cracks was reported according to an arbitrary scale as follows: "very slight," "slight," "moderately severe" (or "mod. severe"), "severe," and "very severe."

In all of the reported tests 2.0 parts by weight of an antiozonant were added to the control formula or masterbatch for each 100 parts of rubber present. The reported results include data on the tensile properties of the cured rubber stocks before and after aging under the conditions stated with respect to the various examples. The modulus and tensile strength are given in pounds per square inch, and the elongation is reported as percent of stretch at the break. These data are included to show that the antiozonants have no substantial deleterious effect upon the cure or upon the aging of the cured stocks.

The rubber may be vulcanized with sulfur or a sulfur donor or with a cross-linking agent such as a dithiol, nitro- or nitroso-compound, etc. Known vulcanization accelerators are useful in speeding up the vulcanization process and operative herein, especially the relatively active accelerators of sulfur vulcanization, including the thiazole sulfenamides, e.g., N-cyclohexyl-2-benzothiazolesulfenamide, thiazoline sulfenamides, thiocarbamyl sulfenamides, mercaptothiazoles, mercaptothiazolines, thiazolyl mono- and di-sulfides, the N,N-disubstituted dithiocarbamates, the thiuram sulfides, the xanthogen sulfides, and metallic salts or mercaptothiazoles or mercaptothiazolines or dithiocarbamic acids.

One or more accelerator activators are often used with any of the accelerators mentioned, and such activators include the various derivatives of guanidine known in the rubber art, amine salts of inorganic and organic acids, various amines themselves, and alkaline salts such as sodium acetate and the like, as well as other activators known in the art. Additionally, two or more accelerators or accelerator combinations are sometimes desirable in a single rubber compound. Many of the accelerators mentioned above are suitable in latex formulations, especially such common accelerators as piperidinium pentamethylene dithiocarbamate, zinc butylxanthate, zinc ethylxanthate, zinc salt of mercaptobenzothiazole, zinc dimethyldithiocarbamate, and zinc dibutyldithiocarbamate. Although vulcanization is usually accomplished by heating a vulcanizable rubber composition at a temperature in the range of 240 to 400° F. for a time ranging from several hours to a few seconds, vulcanization does take place at lower temperatures such as ordinary room temperature. It is quite common to vulcanize a latex film containing an ultra-accelerator by allowing the film to remain at room temperature for several hours or a few days.

Various tests were made on the use of N-aryl-substituted p-phenylenediamines. The first table gives the physical properties, before and after oven-aging four days at 212° F., as well as data on the effect of ozone on a cured tread stock. The antiozonant was added to the following masterbatch made from rubber copolymer of butadiene and styrene known as GR-S:

| | Parts by weight |
|---|---|
| GR-S | 100 |
| Sulfur | 1.7 |
| Black | 45 |
| Stearic acid | 2.5 |
| Zinc oxide | 2.4 |
| Accelerator | 1.2 |
| Softener | 6.6 |
| Total | 159.4 |

The samples were cured 60 minutes at 280° F.

Table I.—Tread stock

| | Blank | Test |
|---|---|---|
| Masterbatch | 159.4 | 159.4 |
| N-phenyl-p-phenylenediamine | | 2 |
| Total | 159.4 | 161.4 |
| Physical properties: | | |
| Before aging— | | |
| 300% modulus | (¹) | 875. |
| Tensile strength | | 3,675. |
| Elongation | | 640. |
| After aging— | | |
| 300% modulus | | 1,650. |
| Tensile strength | | 2,000. |
| Elongation | | 340. |
| Ozone cracking (7 hrs. at 60 p.p.h.m. at 95° F.): | | |
| Static— | | |
| Frequency | Numerous | V. few. |
| Size | Mod. severe | Slight. |
| Dynamic— | | |
| Frequency | Numerous | None. |
| Size | Slight | |

¹ Test strips for physical properties were lost.

The antiozonant had no bad effect on the curing of the rubber, and was quite satisfactory as an antiozonant as judged by the reduced frequency and size of the cracks produced in the stock containing it. In the dynamic test the antiozonant eliminated cracking under the test conditions.

A further test was made by compounding further N-phenyl-p-phenylenediamine with the same tread stock masterbatch. The stocks were aged only 2 days at 212° F. The results are recorded here.

Table II.—Tread stock

| | Blank | Test |
|---|---|---|
| Masterbatch | 159.4 | 159.4 |
| N-phenyl-p-phenylenediamine | | 2 |
| Total | 159.4 | 161.4 |
| Physical properties: | | |
| Before aging— | | |
| 300% modulus | 1,000 | 950. |
| Tensile strength | 2,860 | 3,125. |
| Elongation | 555 | 590. |
| After aging— | | |
| 300% modulus | 2,090 | 1,750. |
| Tensile strength | 2,400 | 2,450. |
| Elongation | 320 | 390. |
| Ozone cracking (7 hrs., room temp., 25 p.p.h.m.): | | |
| Static— | | |
| Frequency | Moderate | V. few. |
| Size | Mod. severe | Slight. |
| Dynamic— | | |
| Frequency | V. numerous | Moderate. |
| Size | Slight | V. slight. |

The antiozonant was quite effective in reducing the attack of ozone, and had no noticeable bad influence on the vulcanization or vulcanizate.

Tests were made on sidewall stock prepared from a masterbatch compounded as follows:

| | Parts by weight |
|---|---|
| GR-S | 100 |
| Black | 45 |
| Zinc oxide | 3 |
| Softener | 10 |
| Sulfur | 2 |
| Accelerator | 1.3 |
| Total | 161.3 |

As wax has been found beneficial in its effect, it was included in one of the test stocks as indicated in the following table in which the results are recorded. The stocks were cured 60 minutes at 280° F. They were aged 4 days at 212° F. The results are recorded below:

Table III.—Sidewall stock

|  | Blank | Test | Blank + wax | Test + wax |
|---|---|---|---|---|
| Masterbatch | 161.3 | 161.3 | 161.3 | 161.3 |
| N-phenyl-p-phenylenediamine |  | 2. |  | 2. |
| Wax |  |  | 3. | 3. |
| Total | 161.3 | 163.3 | 164.3 | 166.3 |
| Physical properties: |  |  |  |  |
| Before aging— |  |  |  |  |
| 300% modulus | 1,575 | 1,450 | 1,400 | 1,250. |
| Tensile strength | 2,300 | 2,170 | 2,075 | 1,850. |
| Elongation | 410 | 430 | 420 | 440. |
| After aging— |  |  |  |  |
| Tensile strength | 1,975 | 1,975 | 1,610 | 1,750. |
| Elongation | 200 | 240 | 200 | 240. |
| Ozone cracking (7 hrs. at room temp., 25 p.p.h.m.): |  |  |  |  |
| Static— |  |  |  |  |
| Frequency | Few | V. Few | None | None. |
| Size | Mod. sev. | Slight |  |  |
| Dynamic— |  |  |  |  |
| Frequency | Few | None | Numerous | None. |
| Size | Slight |  | Mod. sev. |  |

The presence of N-phenyl-p-phenylenediamine in the test stock is seen to have reduced the severity and size of the ozone cracks under static conditions. In the presence of both wax and N-phenyl-p-phenylenediamine no ozone cracking occurred during conditions of the test while in the presence of wax alone numerous severe cracks were formed under dynamic conditions.

The examples and test results are illustrative. The invention is covered by the claims.

What I claim is:

1. Sulfur-vulcanized rubber copolymer of butadiene and styrene containing carbon black and a small amount of N-phenyl-p-phenylenediamine as an antiozonant.

2. The process of producing vulcanized rubber copolymer of butadiene and styrene, which process comprises sulfur-vulcanizing the copolymer containing carbon black and a small amount of N-phenyl-p-phenylenediamine as an antiozonant.

References Cited in the file of this patent

UNITED STATES PATENTS

| 1,950,478 | Calcott et al. | Mar. 13, 1934 |
| 2,377,423 | Howland et al. | June 5, 1945 |
| 2,379,936 | Sloan | July 10, 1945 |
| 2,419,736 | Sloan | Apr. 29, 1947 |

FOREIGN PATENTS

| 23,533 | Australia | July 17, 1935 |

OTHER REFERENCES

Shaw et al.: "Antiozidants for GR–S Rubber," Rubber World, August 1954, pp. 636–642.